(12) United States Patent
Iyer et al.

(10) Patent No.: US 8,543,963 B2
(45) Date of Patent: *Sep. 24, 2013

(54) GLOBAL LEAKAGE POWER OPTIMIZATION

(75) Inventors: Mahesh A. Iyer, Fremont, CA (US);
Sudipto Kundu, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 443 days.

This patent is subject to a terminal disclaimer.

(21) Appl. No.: 12/695,545

(22) Filed: Jan. 28, 2010

(65) Prior Publication Data

US 2011/0185333 A1 Jul. 28, 2011

(51) Int. Cl.
*G06F 17/50* (2006.01)

(52) U.S. Cl.
USPC ........... 716/133; 716/109; 716/113; 716/114; 716/115; 716/132; 716/134; 716/139; 703/13; 703/14; 703/15

(58) Field of Classification Search
USPC ................. 716/113–115, 132–134, 109, 139; 703/13–15
See application file for complete search history.

(56) References Cited

U.S. PATENT DOCUMENTS

| | | | | |
|---|---|---|---|---|
| 6,981,231 | B2 * | 12/2005 | Xie et al. | 716/113 |
| 7,366,997 | B1 * | 4/2008 | Rahmat et al. | 716/111 |
| 7,370,294 | B1 * | 5/2008 | Rahman | 716/108 |
| 7,653,885 | B2 * | 1/2010 | Nandy et al. | 716/133 |
| 7,849,422 | B2 * | 12/2010 | Sferrazza | 716/132 |
| 7,941,779 | B2 * | 5/2011 | Rahmat et al. | 716/132 |
| 8,316,339 | B2 * | 11/2012 | Iyer et al. | 716/133 |

* cited by examiner

*Primary Examiner* — Nghia Doan
(74) *Attorney, Agent, or Firm* — Park, Vaughan, Fleming & Dowler, LLP; Laxman Sahasrabuddhe

(57) ABSTRACT

Some embodiments provide techniques and systems for optimizing a circuit design's global leakage power. During operation, the system can determine leakage potentials for logic gates in the circuit design, such that a logic gate's leakage potential indicates an amount or degree by which the logic gate's leakage power is decreasable. The system can then determine a processing order for processing the logic gates based at least on the leakage potentials. Next, the system can optimize the circuit design's leakage power by attempting to decrease leakage power of logic gates according to the processing order.

21 Claims, 6 Drawing Sheets

GLOBAL LEAKAGE POWER OPTIMIZATION

BACKGROUND

1. Technical Field

This disclosure generally relates to electronic design automation. More specifically, this disclosure relates to methods and apparatuses for global leakage power optimization.

2. Related Art

Advances in semiconductor technology presently make it possible to integrate large-scale systems onto a single semiconductor chip. This dramatic increase in semiconductor integration densities has made it considerably more challenging to efficiently perform leakage power optimization.

The leakage power of a circuit is the amount of power dissipated by the circuit when the circuit's metal-oxide-semiconductor (MOS) transistors are not switching on or off. Note that there is a tradeoff between the speed and the leakage power of a transistor. Specifically, transistors with a low threshold voltage (Vth) can be turned on and off faster than transistors with a high Vth because additional time is required to ramp-up the input voltage of these transistors toward Vth. However, transistors with a high Vth have less leakage power than transistors with a low Vth.

A circuit design's leakage power can be improved by replacing a logic gate with an equivalent logic gate that dissipates a lower leakage power, if the transformation does not violate the performance requirements or electrical design rules of the circuit design. A leakage power optimization operation can attempt to transform every logic gate of a circuit design in search for every opportunity to improve leakage power of the circuit design. Unfortunately, conventional leakage power optimization techniques are inefficient and/or generate poor quality of results (QoR).

SUMMARY

Embodiments of the present invention provide techniques and systems for optimizing a circuit design's leakage power. During operation, the system can determine leakage potentials for logic gates in the circuit design, such that a logic gate's leakage potential indicates an amount or degree by which the logic gate's leakage power is decreasable. Next, the system can determine a processing order for processing the logic gates based at least on the leakage potentials. Then, the system can optimize the circuit design's leakage power by attempting to decrease the leakage power of the logic gates according to the processing order.

To determine the processing order, the system can order the logic gates based at least on a decreasing order of the leakage potentials. In some embodiments, the system can also order the logic gates in reverse topological order. Specifically, the system can associate a level with each logic gate so that each logic gate's level is greater than the highest level associated with logic gates that are electrically coupled to the logic gate's fan-in. Next, the system can order the logic gates in decreasing order of the associated levels. Then, within each level, the system can order the logic gates based on their leakage potential.

In some embodiments, the system can determine the processing order by associating the logic gates with leakage potential bins, such that each leakage potential bin is associated with a range of leakage potential values. Then, the system can order the logic gates based on their associated bins.

During each attempt to decrease the leakage power of the logic gates, the system can determine a local context around one or more logic gates, and select a leakage-power-reducing transformation from a set of leakage-power-reducing transformations which do not violate any design requirements in the local context. Next, the system can determine whether the leakage-power-reducing transformation violates any design requirements in the global context, i.e., the circuit design. Then, in response to determining that the selected leakage-power-reducing transformation does not violate any design requirements in the circuit design, the system applies the selected leakage-power-reducing transformation to the one or more logic gates. Note that the design requirements can include, but are not limited to, timing, capacitance, and transition requirements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Integrated Circuit (IC) Design Flow

Figure 1:
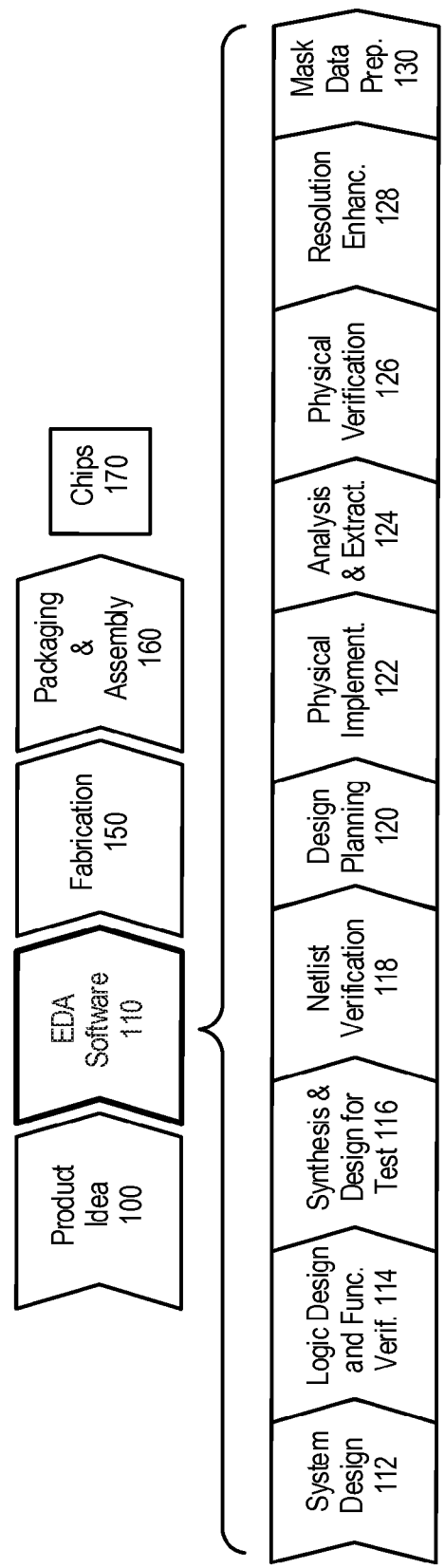
FIG. 1 illustrates various steps in the design and fabrication of an integrated circuit.

FIG. 1 illustrates various steps in the design and fabrication of an integrated circuit. The process starts with a product idea 100, which is realized using Electronic Design Automation (EDA) software 110. Chips 170 can be produced from the finalized design by performing fabrication 150 and packaging and assembly 160 steps.

A design flow that uses EDA software 110 is described below. Note that the design flow description is for illustration purposes only, and is not intended to limit the present invention. For example, an actual integrated circuit design may require a designer to perform the design flow steps in a different sequence than the sequence described below.

In the system design step 112, the designers can describe the functionality to implement. They can also perform what-if planning to refine the functionality and to check costs. Further, hardware-software architecture partitioning can occur at this step. In the logic design and functional verification step 114, a VHDL or Verilog design can be created and checked for functional accuracy.

In the synthesis and design step 116, the VHDL/Verilog code can be translated to a netlist, which can be optimized for the target technology. Further, in this step, tests can be designed and implemented to check the finished chips. In the netlist verification step 118, the netlist can be checked for compliance with timing constraints and for correspondence with the VHDL/Verilog code.

In the design planning step 120, an overall floor plan for the chip can be constructed and analyzed for timing and top-level routing. Next, in the physical implementation step 122, placement and routing can be performed.

In the analysis and extraction step 124, the circuit functionality can be verified at a transistor level. In the physical verification step 126, the design can be checked to ensure correctness for manufacturing, electrical issues, lithographic issues, and circuitry.

In the resolution enhancement step 128, geometric manipulations can be performed on the layout to improve manufacturability of the design. Finally, in the mask data preparation step 130, the design can be taped-out for production of masks to produce finished chips.

Embodiments of the present invention can be used in one or more of the above-described steps.

The Leakage Power Optimization Problem

A circuit design's representation is composed of logic gate instantiations, such that each logic gate is associated with a leakage power. If MOS transistors are used, the leakage power is dependent on the threshold voltages for the MOS transistors in the logic gate. As noted above, the performance of the logic gate (e.g., the maximum switching frequency of a MOS transistor) is also dependent on the threshold voltage. A circuit designer's goal is to minimize the leakage power of the circuit, without violating any design requirements for the circuit design (e.g., timing, capacitance, or transition requirements).

Leakage power optimization can be performed by applying transformations to logic gates of the circuit design. A transformation of a logic gate is generally any modification of the logic gate. For example, a transformation can involve replacing a logic gate with a different logic gate from a technology library, such that the functionality of the circuit is maintained. Before applying a transformation to a logic gate, the system can determine whether the transformation violates any performance requirements or electrical design rules of the circuit design. If the transformation does not violate any performance or design requirements, the system can apply the transformation. Otherwise, the system can try a different transformation.

Conventional techniques for leakage power optimization try to optimize all logic gates in the circuit design. If the circuit design is large, trying to optimize the leakage power of all logic gates can result in an unreasonably long computation time. Hence, conventional techniques typically impose a time limit for performing leakage power optimization. In other words, the system tries to optimize the leakage power of all logic gates, but terminates the process after a predetermined amount of time. Although this approach ensures that the optimization process is guaranteed to terminate within the predetermined amount of time, it can result in poor QoR. Hence, what are needed are efficient techniques and systems for optimizing the leakage power of a circuit design that results in good QoR.

Leakage Power Optimization

Embodiments of the present invention provide a system for optimizing a circuit design's leakage power without violating any design requirements for the circuit design. This system computes a leakage potential for each logic gate of the circuit design, and optimizes the circuit design's leakage power by attempting to transform logic gates based on their leakage potential values. Specifically, the system tries to optimize logic gates that have high leakage potential values before trying to optimize logic gates that have low leakage potential values.

The leakage potential of a logic gate in a circuit design is the maximum leakage improvement that can be achieved by replacing the logic gate with a functionally equivalent logic gate which has the lowest leakage power. For example, assume that a technology library has 100 physical implementations for a buffer, and the leakage power of these buffers is within the range [10, 1000] μW. Also, assume that a buffer in a circuit design has a leakage power of 500 μW. The leakage potential of this buffer is (500−10)μW=490 μW. Therefore, the maximum leakage improvement that can be achieved by replacing this buffer with another buffer is 490 μW.

During operation, the system uses a technology library that includes a variety of physical implementations for logic gates, and includes a leakage power value for each physical implementation. The MOS transistors used to implement these physical implementations can vary by transistor dimensions, threshold voltage, gate capacitance, etc. Note that the leakage power of a logic gate typically increases exponentially with respect to the threshold voltage of the transistors in the logic gate.

The system can use a leakage power budget for a circuit design to minimize the computation effort invested in optimizing a circuit design's leakage power. The leakage power budget is a circuit designer's budget for how much leakage power a chip is allowed to dissipate. The leakage power budget enables the system to de-prioritize logic gates that have a very low leakage potential. For example, assume that the leakage power of a circuit design is 500 µW, and assume the leakage power budget is 250 µW. Now, once the system optimizes the circuit design's leakage power to 250 µW by working on higher leakage potential logic gates, the system can sacrifice an additional reduction in leakage power by terminating the optimization process.

Figure 2A:
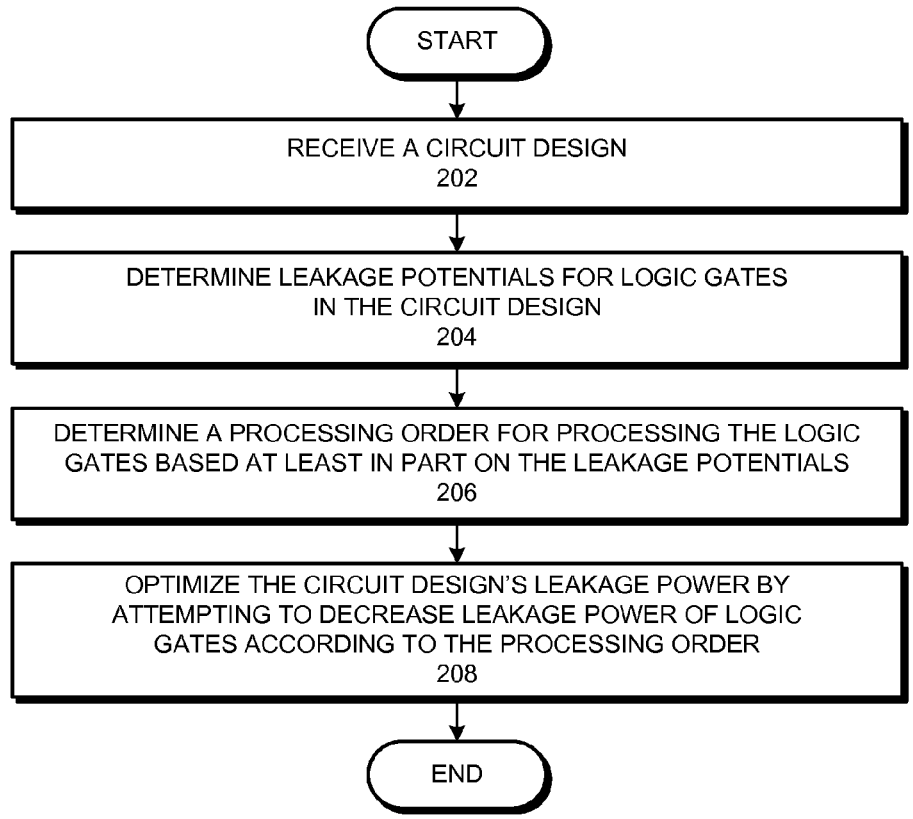
FIG. 2A presents a flowchart illustrating a process for optimizing a circuit design's leakage power in accordance with some embodiments of the present invention.

FIG. 2A presents a flowchart illustrating a process for optimizing a circuit design's leakage power in accordance with some embodiments of the present invention.

The process can be performed by a computer system which stores instructions and executes these instructions using a processor. The system can begin by receiving a circuit design (operation 202), and determining leakage potentials for logic gates in the circuit design (operation 204). A logic gate's leakage potential indicates an amount or degree by which the logic gate's leakage power is decreasable. Next, the system determines a processing order for processing the logic gates based at least on the leakage potentials (operation 206). The system then optimizes the circuit design's leakage power by attempting to decrease the leakage power of the logic gates according to the processing order (operation 208). In some embodiments, the system can perform operation 206 by ordering the logic gates based at least on a decreasing order of the leakage potential.

The system can also order the logic gates based at least on a topological ordering of the logic gates. For example, the system can associate a level with each logic gate. Specifically, logic gates whose fan-in is coupled to a primary input of the circuit design are assigned level 0, and all other logic gates are assigned a level that is greater than the highest level associated with the logic gates that are electrically coupled to the logic gate's fan-in. Then, the system can determine a reverse-levelized order for processing the logic gates by ordering the logic gates in decreasing order of the associated levels.

Figure 2B:
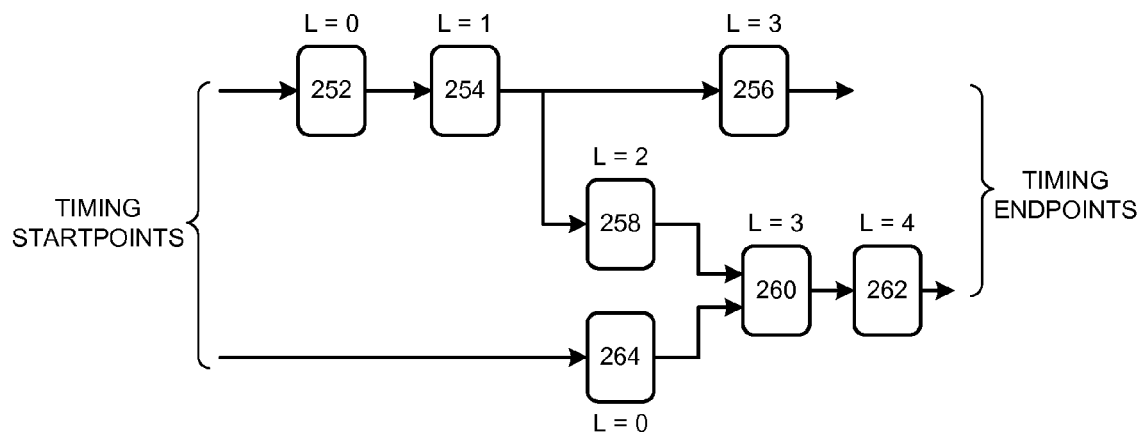
FIG. 2B illustrates how levels can be associated with logic gates in accordance with some embodiments of the present invention.

FIG. 2B illustrates how levels can be associated with logic gates in accordance with some embodiments of the present invention.

Logic gates 252-264 are part of a circuit design. The inputs to gates 252 and 264 are the timing startpoints of the circuit design. The system can associate levels to the logic gates as shown in FIG. 2B. Specifically, the notation "L=n," where n is a number, indicates that the level associated with the logic gate is equal to n. As shown in FIG. 2B, the system can associate level 0 with logic gates 252 and 264, level 1 with logic gate 254, level 2 with logic gate 258, level 3 with logic gates 256 and 260. Note that logic gate 260's inputs are electrically coupled with logic gates 258 and 264, which are associated with levels 2 and 0, respectively. Since the level associated with a logic gate is greater than the levels associated with any of its fan-in logic gates, logic gate 260 has been associated with level 3 in FIG. 2B. Finally, the system can associate level 4 with logic gate 262. Now, to process logic gates in reverse topological order, the system can start with logic gate 262 which is associated with the highest level, and proceed toward logic gates that are associated with lower levels.

Figure 3:
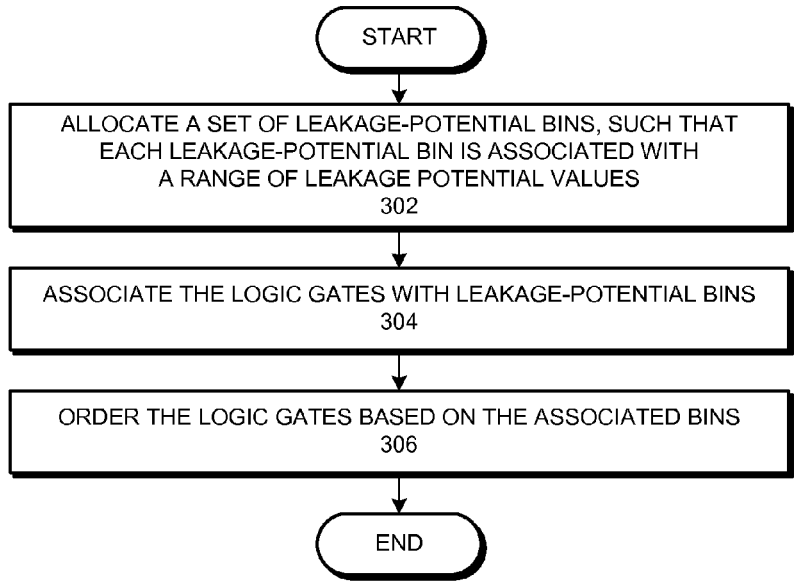
FIG. 3 presents a flowchart illustrating a process for determining a processing order for processing logic gates in a circuit design in accordance with some embodiments of the present invention.

FIG. 3 presents a flowchart illustrating a process for determining a processing order for processing logic gates in a circuit design in accordance with some embodiments of the present invention. Operations 302-306 can expand upon operation 206 of FIG. 2A.

The system can begin by allocating a set of leakage potential bins, such that each leakage potential bin is associated with a range of leakage potential values (operation 302). Next, the system associates the logic gates with leakage potential bins (operation 304), and orders the logic gates based on the associated bins (operation 306).

During operation 304, the logic gate instances are classified or binned into groups based on their leakage potential values. For example, the first bin can be associated with logic gate instances that have a highest leakage potential, and the last bin can be associated with logic gate instances that have a lowest leakage potential.

Logic gates associated with a particular bin do not need to have the same leakage potential, but rather are associated with a range of leakage potential values that have been assigned to that bin. Binning the logic gates of a circuit design into a predetermined set of bins facilitates evaluating the leakage potential for groups of logic gates. For example, the sum of leakage potential values for a particular bin's set of logic gates can be used to determine a bin's potential.

The bin potential ratio can be defined as the sum of the leakage potentials of logic gates in a particular bin divided by the circuit's leakage power. The bin potential ratio (BPR) for a bin can be represented as:

$$BPR_i = \frac{\sum_{l \in b_i} p_l}{L}, \quad (1)$$

where $BPR_i$ is the bin potential ratio for bin $b_i$, l is a logic gate, $p_l$ is the leakage potential of logic gate l, and L is the leakage power of the circuit design.

Note that the $BPR_i$ indicates the maximum improvement in leakage power that can be achieved if the system were to transform all logic gates associated with the bin $b_i$ to their lowest leakage power implementation in the technology library. The $BPR_i$ of bin $b_i$ can be used to determine whether to process logic gates in bin $b_i$. For example, if the $BPR_i$ of bin $b_i$ is lower than a predetermined threshold, the system may skip processing the logic gates in bin $b_i$.

In some embodiments, the system can order the logic gates in a bin in decreasing order of the associated levels. This allows the system to process the logic gates associated with each bin in reverse-levelized order.

Figure 4:
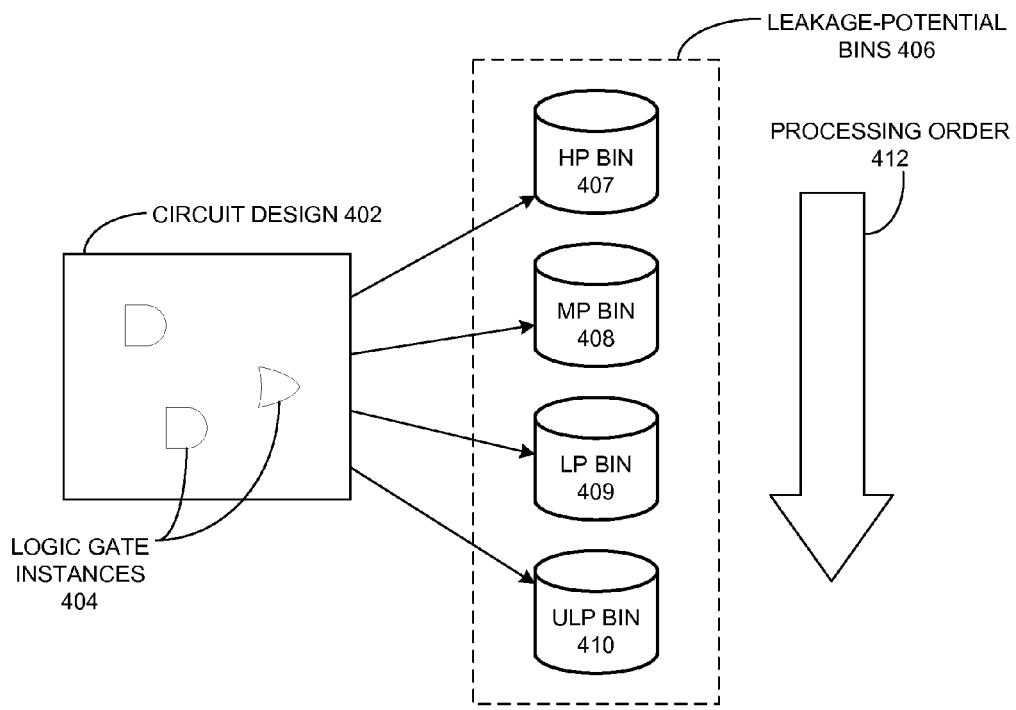
FIG. 4 illustrates a set of leakage potential bins and an exemplary processing order in accordance with some embodiments of the present invention.

FIG. 4 illustrates a set of leakage potential bins and an exemplary processing order in accordance with some embodiments of the present invention. Circuit design 402 includes a set of logic gate instances 404, and leakage potential bins 406 can include a predetermined set of bins. For example, leakage potential bins 406 can include four bin categories: a high potential (HP) bin 407, a medium potential (MP) bin 408, a low potential (LP) bin 409, and an ultra-low potential (ULP) bin 410. Further, a bin associated with a higher bin category (e.g., bin 407) can be associated with a higher range of leakage potential values than bins that are associated with a lower bin category (e.g., bins 408-410).

During operation, the system can associate each logic gate instance of circuit design 402 with a corresponding leakage potential bin, and then process logic gate instances 404 based in part on processing order 412. For example, the system can process logic gates associated with bin 407 before processing logic gates associated with any other bin. Then, the system can process logic gates associated with the other bins using processing order 412 either until a performance goal for circuit design 402 has been met, or until the quality of returns (QoR) per processing operation falls below a threshold value.

The logic gates in each bin can be processed in reverse-levelized order. That is, first the logic gates in HP bin 407 are optimized by visiting them in reverse-levelized order, then the logic gates in MP bin 408 are optimized by visiting them in reverse-levelized order, etc.

In some embodiments, the system can associate logic gates with leakage potential bins by first sorting the circuit design's logic gates based in part on their leakage potential values, and then partitioning the sorted set of logic gates evenly across leakage potential bins 406 (i.e., so that all bins are associated with a similar number of logic gates). In some other embodiments, the system can associate logic gates with leakage potential bins by first dividing the full range of leakage potential values across leakage potential bins 406, and then associating each logic gate with a corresponding leakage potential bin.

Local Optimization Context

Figure 5A:
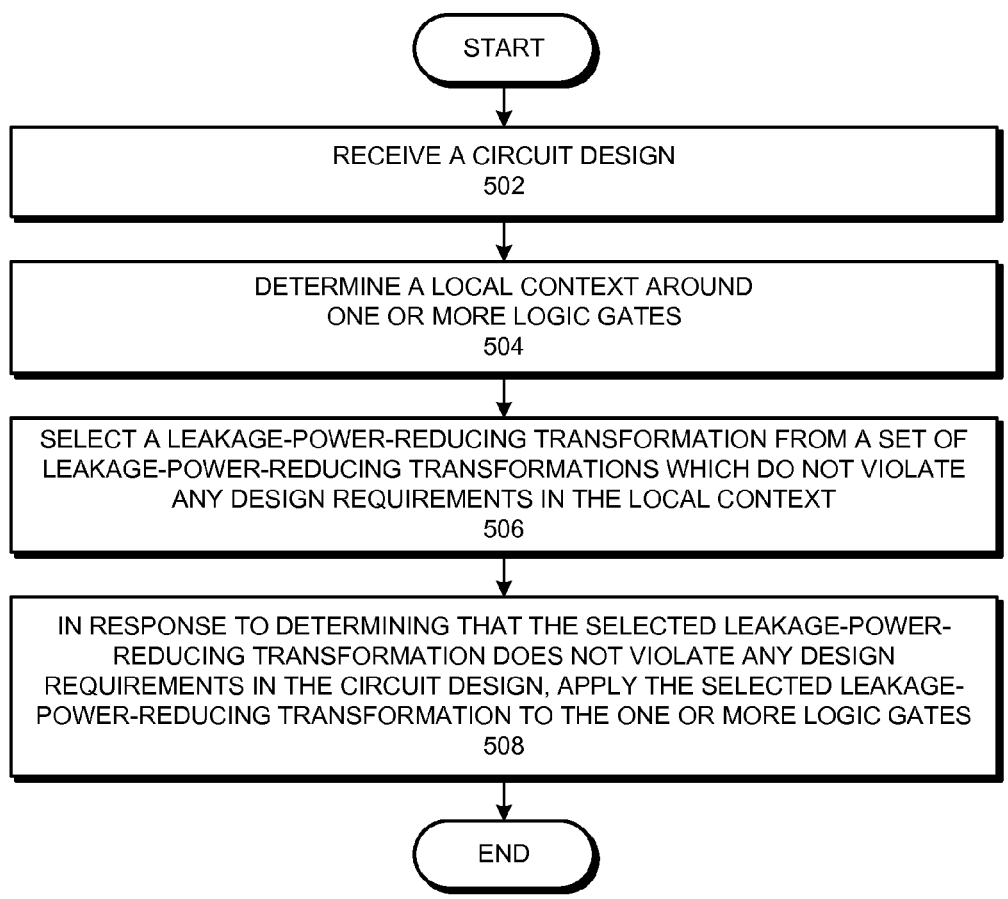
FIG. 5A presents a flowchart illustrating a process for attempting to decrease the leakage power of logic gates in accordance with some embodiments of the present invention.

FIG. 5A presents a flowchart illustrating a process for attempting to decrease the leakage power of logic gates in accordance with some embodiments of the present invention.

Operations 502-508 can expand upon operation 208 of FIG. 2A. The system can begin by receiving a circuit design (operation 502), and determining a local context around one or more logic gates (operation 504). Next, the system selects a leakage-power-reducing transformation from a set of leakage-power-reducing transformations which do not violate any design requirements in the local context (operation 506). Then, in response to determining that the selected leakage-power-reducing transformation does not violate any design requirements in the circuit design, the system applies the selected leakage-power-reducing transformation to the one or more logic gates (operation 508).

The system can generate a local optimization context for the selected logic gate by selecting logic gates that are logically connected to the selected logic gate. In general, a local context around a set of logic gates is a portion of the circuit design that includes the set of logic gates. The exact size and scope of the local context can depend on the application. Specifically, in some embodiments, the system can select a local context around a logic gate as follows. First the system can determine logic gates that are in the immediate fan-out levels (typically 1-3 levels). Next, the system can determine logic gates that are in the immediate fan-in levels (typically 1-3 levels). Then, for each logic gate in the immediate fan-in levels, the system can determine logic gates that are in the immediate fan-out levels.

Figure 5B:
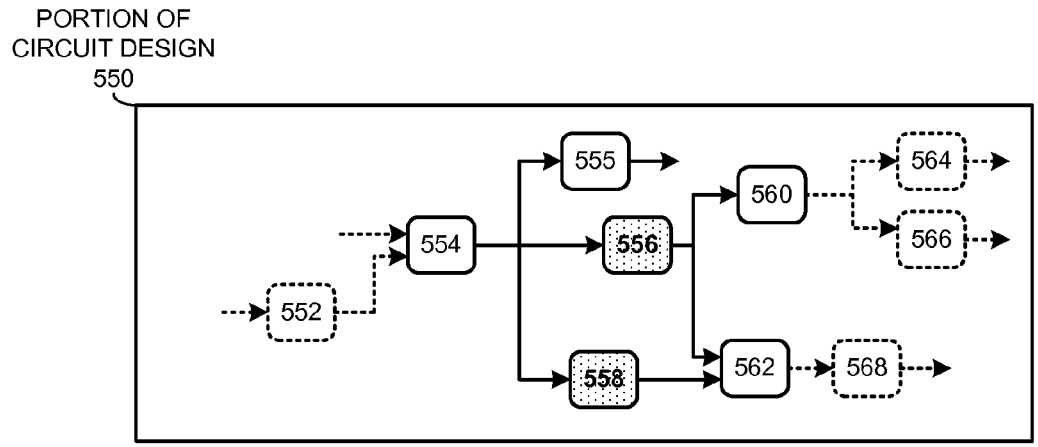
FIG. 5B illustrates a local optimization context around one or more logic gates in accordance with some embodiments of the present invention.

FIG. 5B illustrates a local optimization context around one or more logic gates in accordance with some embodiments of the present invention.

Portion of circuit design 550 is part of a circuit design which includes logic gates 552-568. Suppose the system selects logic gates 556 and 558 for optimization. The system can then determine a local context around logic gates 556 and 558 by selecting gates 554, 555, 560, and 562. Note that the logic gates shown with dotted lines are not within the local optimization context.

The system can then evaluate performance metrics such as worst negative slack (WNS), total negative slack (TNS), and electrical design rules like max_capacitance, max_transition, etc. within the local optimization context, and use the value of these metrics to select a transformation. Typically a transformation that is selected is one which improves leakage power in the local optimization context, and does not degrade metrics such as WNS, TNS, and electrical design rules like max_capacitance, max_transition, etc.

Figure 6:
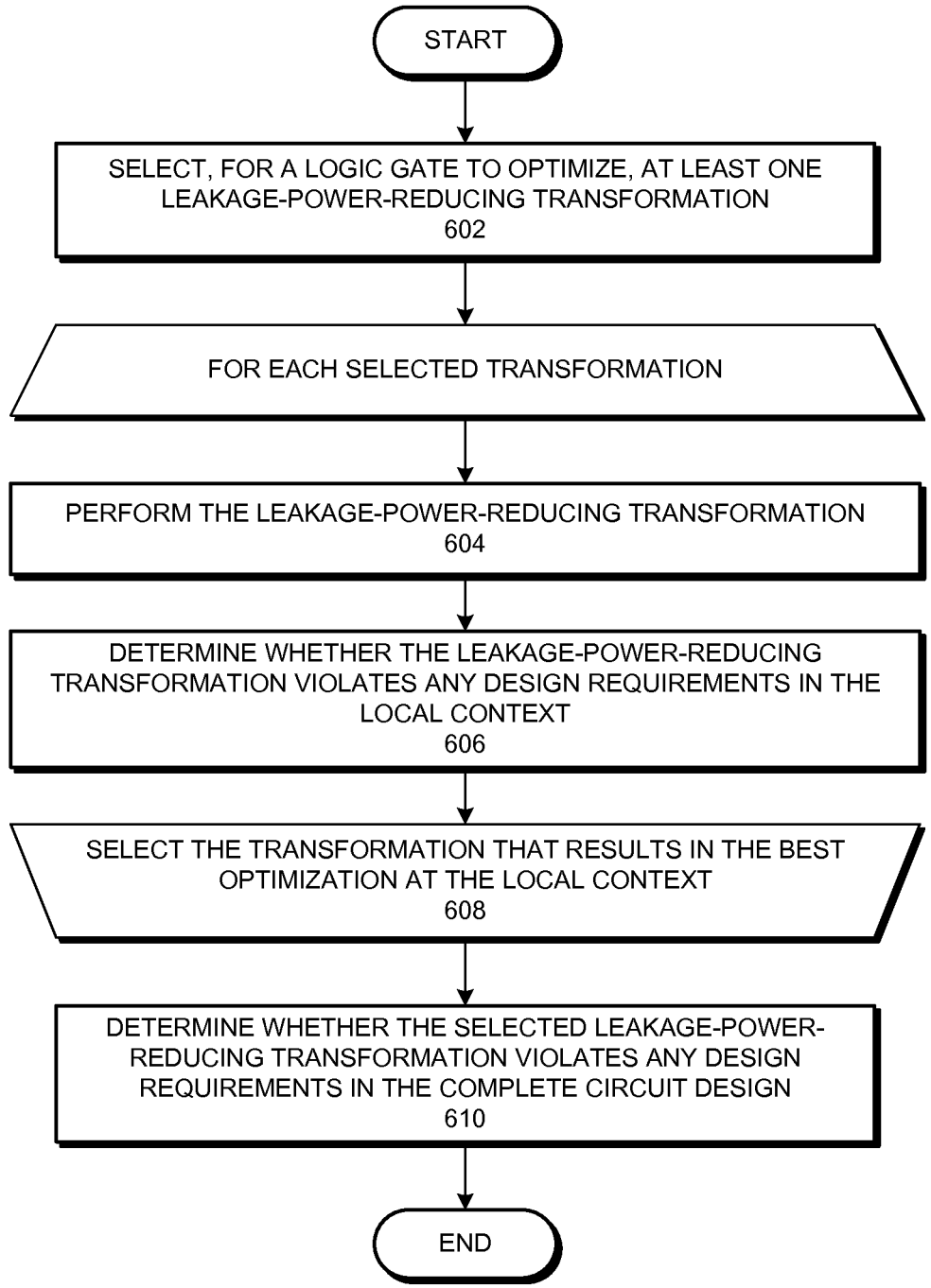
FIG. 6 presents a flowchart illustrating a process for selecting and evaluating a leakage-power-reducing transformation to apply across a circuit design in accordance with some embodiments of the present invention.

FIG. 6 presents a flowchart illustrating a process for selecting and evaluating a leakage-power-reducing transformation to apply across a circuit design in accordance with some embodiments of the present invention.

Operations 602-608 can expand upon operation 506 of FIG. 5. The system can begin by selecting, for a logic gate to optimize, at least one leakage-power-reducing transformation (operation 602). Then, for each selected transformation, the system can perform the leakage-power-reducing transformation (operation 604), and determine whether the leakage-power-reducing transformation violates any design requirements in the local context (operation 606). The system can then select the transformation that results in the best optimization at the local context (operation 608), and determine whether the selected leakage-power-reducing transformation violates any design requirements in the complete circuit design (operation 610).

Operation 606 can include evaluating timing and electrical properties in the local context to determine whether the transformation violates any timing and/or electrical design requirements in the local context. For example, the system can determine timing slack values on the endpoints of the local optimization context shown in FIG. 5B. These include the output terminals of logic gates 560, 562, and 555.

Operation 610 can include evaluating timing and electrical properties globally across the circuit design to determine whether the transformation violates any timing and/or electrical design requirements in the entire circuit design. Analyzing these electrical and timing properties across the entire circuit design is computationally expensive. Operations 602-610 effectively minimize the number of such electrical and/or timing analysis operations that need to be performed across the entire circuit design.

Note that, as the number of logic gates that are transformed simultaneously in the local context increases, the likelihood that the optimization operation is rejected during the global evaluation operation also increases. Hence, in some embodiments, the logic gates associated with a higher leakage potential are optimized one at a time to minimize the probability that the transformation will be rejected in the global context. Furthermore, for high leakage potential logic gates, the system may use a larger local context to check compliance with design requirements.

For low leakage potential and ultra-low leakage potential logic gates, the system can select multiple logic gates to optimize simultaneously. The system can perform the global evaluation operation only once for the best set of transformations for the selected logic gates. The system may reject all of the transformations if the resulting circuit design violates a design requirement even if most of the transformations are acceptable if performed individually. Note that the loss in leakage Quality of Results (QoR) in this case would be minimal because the logic gates that were being transformed did not have much leakage potential to begin with.

Optimization Transformations

In addition to replacing a logic gate with another functionally equivalent logic gate from a cell library, the system can employ other transformations for optimizing leakage power. In some embodiments, the system can unphase a logic gate. For example, if an AND gate is followed by an inverter, the system can replace the AND gate and the inverter with a NAND gate that has a lower leakage power, when compared to that of the AND gate and the inverter. The system can also replace double inverters with a buffer.

In some embodiments, the system can perform resizing operations on a logic gate being optimized and its fan-out loads in parallel, so that the overall transformation produces less leakage power. In some embodiments, the system can remove a sequence of buffers and re-size the logic gate being optimized. Note that this transformation results in a lower leakage power because the buffers that are removed have larger total leakage power than that introduced by the larger logic gate.

Adaptive Bailout

In some embodiments, the system can determine the leakage power of the circuit design after processing each bin, and can determine whether to continue the optimization process based on the leakage power improvement.

For example, the system can determine the amount of leakage power improvement obtained from processing logic gates in a bin. If the system determines that the leakage power budget for the circuit design has been met, the system can terminate the leakage power optimization process. Otherwise, if the leakage power budget for the circuit design has not been met, the system can continue to optimize the circuit design either until the leakage power budget is met or until the improvement falls below a predetermined threshold. For example, if the leakage power only decreased by 0.1% when the last bin was processed, the system may determine to terminate the optimization process, or ask the user whether the user wants to continue with the optimization process.

In some embodiments, the system can dynamically adjust the number of logic gates it uses for optimization based on the rate at which leakage power decreases. For example, if the system determines that the decrease in leakage power is less than a predetermined threshold, the system can start optimizing more logic gates at once to try to reduce the number of global timing updates, thereby improving the effectiveness of each optimization transformation.

Figure 7:
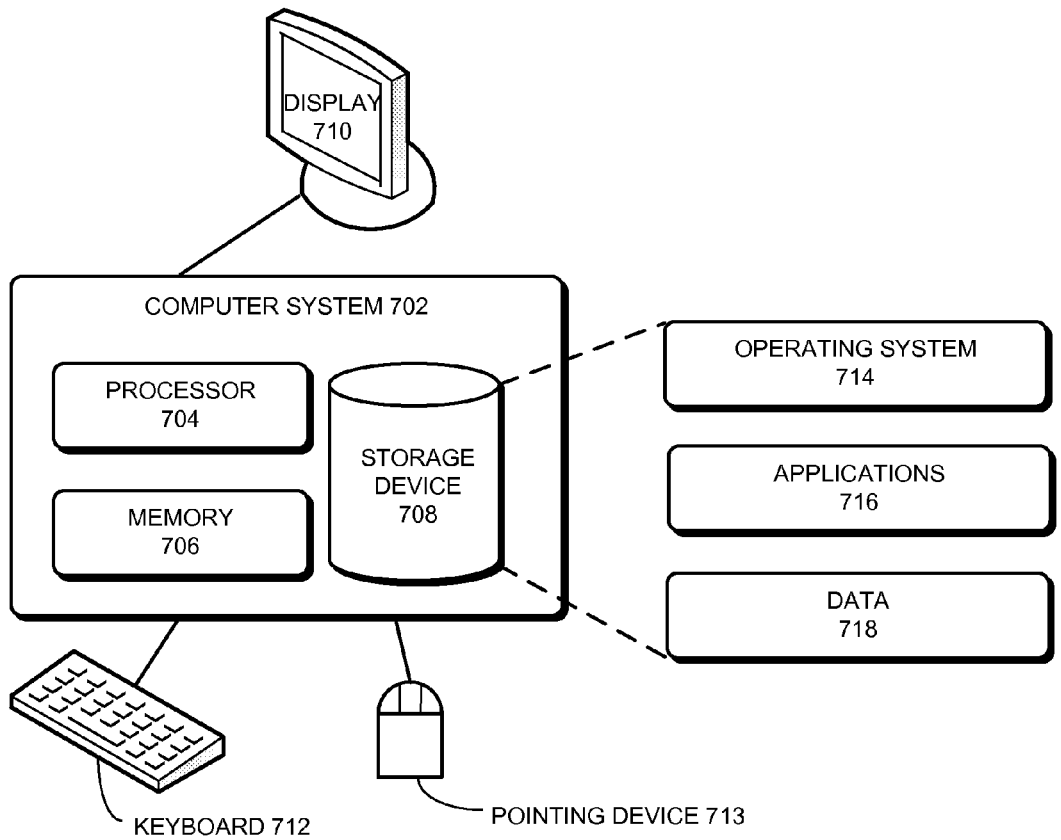
FIG. 7 illustrates a computer system in accordance with some embodiments of the present invention.

FIG. 7 illustrates a computer system in accordance with some embodiments of the present invention.

Computer system 702 includes a processor 704, a memory 706, and a storage device 708. Furthermore, computer system 702 can be coupled to a display device 710, a keyboard 712, and a pointing device 713. Storage device 708 can store operating system 714, applications 716, and data 718.

Applications 716 can include instructions which when executed by computer system 702 can cause computer system 702 to perform methods and/or processes described in this disclosure. Specifically, applications 716 can include instructions for receiving a set of logic gates in a circuit design, determining leakage potentials for the set of logic gates, determining a processing order for processing the logic gates based at least on the leakage potentials, optimizing the circuit design's leakage power, and determining whether a leakage-power-reducing transformation violates any design requirements.

Data 718 can include any data that is required as input or that is generated as output by the methods and/or processes described in this disclosure. Specifically, data 718 can include representations for a circuit design, leakage potential values for logic gates in the circuit design, leakage potential bins, a technology library, and design requirements for the circuit design.

Figure 8:
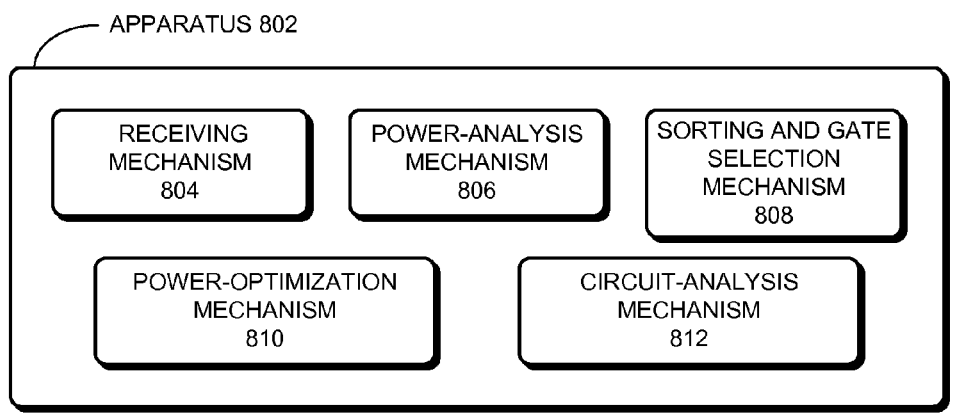
FIG. 8 illustrates an apparatus in accordance with some embodiments of the present invention.

FIG. 8 illustrates an apparatus in accordance with some embodiments of the present invention.

Apparatus 802 can comprise a plurality of mechanisms which may communicate with one another via a wired or wireless communication channel. Apparatus 802 may be realized using one or more integrated circuits, and apparatus 802 may include fewer or more mechanisms than those shown in FIG. 8. Further, apparatus 802 may be integrated in a computer system, or it may be realized as a separate device which is capable of communicating with other computer systems and/or devices. Specifically, apparatus 802 can comprise receiving mechanism 804, power-analysis mechanism 806, sorting mechanism 808, power-optimization mechanism 810, and circuit-analysis mechanism 812.

In some embodiments, receiving mechanism 804 may be configured to receive a set of logic gates in a circuit design which are candidates for leakage power optimization, and power-analysis mechanism 806 may be configured to determine leakage potentials for the logic gates in the circuit design. Sorting and gate selection mechanism 808 may be configured to determine a processing order for processing the logic gates based at least on the leakage potentials. Power-optimization mechanism 810 may be configured to optimize the circuit design's leakage power by attempting to decrease leakage power of logic gates according to the processing order. Circuit-analysis mechanism 812 may be configured to determine whether a leakage-power-reducing transformation violates any design requirements in a local context of the circuit design, or whether the leakage-power-reducing transformation violates any design requirements in the entire circuit design.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executed method for optimizing a circuit design's leakage power, the method comprising:
determining leakage potentials for logic gates in the circuit design, wherein a logic gate's leakage potential is determined based on a difference between the logic gate's leakage power and a leakage power of another logic gate in a library;
determining a processing order for processing the logic gates based at least on the leakage potentials; and
optimizing, by computer, the circuit design's leakage power by attempting to decrease leakage power of logic gates according to the processing order, wherein said optimizing involves:
selecting a leakage-power-reducing transformation to apply to one or more logic gates, and
in response to determining that applying the selected leakage-power-reducing transformation to the one or more logic gates does not violate any design requirements in the circuit design, applying the selected leakage-power-reducing transformation to the one or more logic gates.

2. The computer-executed method of claim 1, wherein determining the processing order includes ordering the logic gates based at least on a decreasing order of the leakage potentials.

3. The computer-executed method of claim 2, wherein determining the processing order further includes:
associating a level with each logic gate so that each logic gate's level is greater than the highest level associated with logic gates that are electrically coupled to the logic gate's fan-in; and
ordering the logic gates in decreasing order of the associated levels.

4. The computer-executed method of claim 1, wherein determining the processing order includes:

associating the logic gates with leakage potential bins, wherein each leakage potential bin is associated with a range of leakage potential values; and order the logic gates based on the associated bins.

5. The computer-executed method of claim 4, wherein the optimization process terminates if the decrease in the circuit design's leakage power is less than a predetermined threshold.

6. The computer-executed method of claim 1, wherein optimizing the circuit design's leakage power by attempting to decrease the leakage power of logic gates includes:

determining a local context around one or more logic gates;

selecting a leakage-power-reducing transformation from a set of leakage-power-reducing transformations which do not violate any design requirements in the local context; and in response to determining that the selected leakage-power-reducing transformation does not violate any design requirements in the circuit design, applying the selected leakage-power-reducing transformation to the one or more logic gates.

7. The computer-executed method of claim 6, wherein the design requirements include one or more of: timing requirements, capacitance requirements, and transition requirements.

8. A non-transitory computer-readable storage medium storing instructions that when executed by a computer cause the computer to perform a method for optimizing a circuit design's leakage power, the method comprising:

determining leakage potentials for logic gates in the circuit design, wherein a logic gate's leakage potential is determined based on a difference between the logic gate's leakage power and a leakage power of another logic gate in a library;

determining a processing order for processing the logic gates based at least on the leakage potentials; and optimizing the circuit design's leakage power by attempting to decrease leakage power of logic gates according to the processing order, wherein said optimizing involves:

selecting a leakage-power-reducing transformation to apply to one or more logic gates, and in response to determining that applying the selected leakage-power-reducing transformation to the one or more logic gates does not violate any design requirements in the circuit design, applying the selected leakage-power-reducing transformation to the one or more logic gates.

9. The non-transitory computer-readable storage medium of claim 8, wherein determining the processing order includes ordering the logic gates based at least on a decreasing order of the leakage potentials.

10. The non-transitory computer-readable storage medium of claim 9, wherein determining the processing order further includes:

associating a level with each logic gate so that each logic gate's level is greater than the highest level associated with logic gates that are electrically coupled to the logic gate's fan-in; and ordering the logic gates in decreasing order of the associated levels.

11. The non-transitory computer-readable storage medium of claim 8, wherein determining the processing order includes:

associating the logic gates with leakage potential bins, wherein each leakage potential bin is associated with a range of leakage potential values; and ordering the logic gates based on the associated bins.

12. The non-transitory computer-readable storage medium of claim 11, wherein the optimization process terminates if the decrease in the circuit design's leakage power is less than a predetermined threshold.

13. The non-transitory computer-readable storage medium of claim 8, wherein optimizing the circuit design's leakage power by attempting to decrease the leakage power of logic gates includes:

determining a local context around one or more logic gates;

selecting a leakage-power-reducing transformation from a set of leakage-power-reducing transformations which do not violate any design requirements in the local context; and in response to determining that the selected leakage-power-reducing transformation does not violate any design requirements in the circuit design, applying the selected leakage-power-reducing transformation to the one or more logic gates.

14. The non-transitory computer-readable storage medium of claim 13, wherein the design requirements include one or more of: timing requirements, capacitance requirements, and transition requirements.

15. An apparatus for optimizing a circuit design's leakage power, comprising:

a power-analysis mechanism configured to determine leakage potentials for logic gates in the circuit design, wherein a logic gate's leakage potential is determined based on the logic gate's leakage power and a leakage power of another logic gate in a library;

a sorting mechanism configured to determine a processing order for processing the logic gates based at least on the leakage potentials; and a power-optimization mechanism configured to optimize the circuit design's leakage power by attempting to decrease leakage power of logic gates according to the processing order, wherein said optimizing involves:

selecting a leakage-power-reducing transformation to apply to one or more logic gates, and in response to determining that applying the selected leakage-power-reducing transformation to the one or more logic gates does not violate any design requirements in the circuit design, applying the selected leakage-power-reducing transformation to the one or more logic gates.

16. The apparatus of claim 15, wherein the sorting mechanism is further configured to order the logic gates based at least on a decreasing order of the leakage potentials.

17. The apparatus of claim 16, wherein the sorting mechanism is further configured to:

associate a level with each logic gate so that each logic gate's level is greater than the highest level associated with logic gates that are electrically coupled to the logic gate's fan-in; and order the logic gates in decreasing order of the associated levels.

18. The apparatus of claim 15, wherein the sorting mechanism is further configured to:

associate the logic gates with leakage potential bins, wherein each leakage potential bin is associated with a range of leakage potential values; and order the logic gates based on the associated bins.

19. The apparatus of claim 18, wherein the power-optimization mechanism is configured to terminate the optimization process if the decrease in the circuit design's leakage power is less than a predetermined threshold.

20. The apparatus of claim 15, wherein the power-optimization mechanism is further configured to:

determine a local context around one or more logic gates;
select a leakage-power-reducing transformation from a set of leakage-power-reducing transformations which do not violate any design requirements in the local context; and
in response to determining that the selected leakage-power-reducing transformation does not violate any design requirements in the circuit design, apply the selected leakage-power-reducing transformation to the one or more logic gates.

21. The apparatus of claim 20, wherein the design requirements include one or more of: timing requirements, capacitance requirements, and transition requirements.

\* \* \* \* \*